(12) United States Patent
Jaehn (10) Patent No.: US 12,396,831 B2
(45) Date of Patent: Aug. 26, 2025

(54) MANUFACTURING OF ORTHODONTIC DEVICES BASED ON STANDARDIZED SCAN REPRESENTATIONS

(71) Applicant: INSTITUT STRAUMANN AG, Basel (CH)

(72) Inventor: Benjamin Jaehn, Chemnitz (DE)

(73) Assignee: INSTITUT STRAUMANN AG, Basel (CH)

( * ) Notice: Subject to any disclaimer, the term of this patent is extended or adjusted under 35 U.S.C. 154(b) by 311 days.

(21) Appl. No.: 18/317,948

(22) Filed: May 16, 2023

(65) Prior Publication Data
US 2023/0363867 A1    Nov. 16, 2023

(30) Foreign Application Priority Data
May 16, 2022  (EP) .................................... 22173511

(51) Int. Cl.
*G06T 7/10*  (2017.01)
*A61C 9/00*  (2006.01)
*A61C 13/00*  (2006.01)
*G06T 17/00*  (2006.01)

(52) U.S. Cl.
CPC ........ *A61C 13/0004* (2013.01); *A61C 9/0053* (2013.01); *G06T 7/10* (2017.01); *G06T 17/00* (2013.01)

(58) Field of Classification Search
CPC ... A61C 13/0004; A61C 9/004; A61C 9/0053; A61C 2007/004; A61C 13/0003; G06T 7/10; G06T 7/11; G06T 7/00; G06T 11/00; G06T 15/00
See application file for complete search history.

(56) References Cited

U.S. PATENT DOCUMENTS

2020/0175681 A1   6/2020  Ezhov et al.
2023/0320823 A1 * 10/2023  Marshall .............. A61C 19/045
                                                          433/69

FOREIGN PATENT DOCUMENTS

| CN | 102609965 A | 7/2012 | |
| CN | 107301622 A | 10/2017 | |
| EP | 3875054 A1 * | 9/2021 | ............. A61C 11/00 |
| JP | 2004504077 A * | 2/2004 | |
| WO | WO-2021215582 A1 * | 10/2021 | |

* cited by examiner

*Primary Examiner* — Kee M Tung
*Assistant Examiner* — Thang Gia Huynh
(74) *Attorney, Agent, or Firm* — LEYDIG, VOIT & MAYER, LTD.

(57) ABSTRACT

A process for manufacturing an orthodontic device includes scanning at least a part of a patient's dentition so as to record a volumetric 3-dimensional scan data, and segmenting the scan data so as to obtain individual teeth and/or jaws. A tooth main axis is determined for each tooth in order to obtain a two-dimensional key point representation of each tooth in the occlusal plane. An even order parametric polynomial curve is fit to approximate the dental arch. The even order polynomial curve is transformed into a spline representation. One or more 2-dimensional cuts through the volumetric 3-dimensional digital scan data is selected, wherein at least one size dimension of a tooth is determined from the 2-dimensional cut. An orthodontic device is manufactured, wherein at least one size dimension of the orthodontic device is a function of the size dimension of the tooth.

13 Claims, 4 Drawing Sheets

MANUFACTURING OF ORTHODONTIC DEVICES BASED ON STANDARDIZED SCAN REPRESENTATIONS

CROSS REFERENCE TO RELATED APPLICATIONS

This application claims benefit to European Patent Application No. EP 22 173 511.1, filed on May 16, 2022, which is hereby incorporated by reference herein.

FIELD

The present invention relates to a process for manufacturing of an orthodontic device.

The present invention further relates to the use of the process in the manufacturing of a dental reconstruction and to a computer program product comprising computer readable program code for performing the method.

BACKGROUND

The planning of a dental restoration and the treatment specific selection or production of dental implants is a difficult task. On the one hand this finding is based on the fact, that especially in the field of dentistry each patient comprises a very specific teeth configuration. On the other hand the jaw and a single tooth can in rare cases be considered independently, because there is always an interrelation between different tooth positions in and between the yaws. Therefore, a complex treatment situation is present and has to be considered in the course of planning and production of dental devices. In order to reduce the complexity for dental professionals, dental planning software is used assisting the planning of dental reconstructions of a patient's dentition and the manufacturing of patient specific solutions. The software may include the planning of the placement and the selection of dental implants, planning of orthodontic treatment plans, designing prosthetics, planning and designing surgical guides for use during implant installation and other dental surgery. To properly plan and design, the dental professional must be able to understand and work with an accurate representation of the patient's dentition, jaw(s) and other supporting structure. Therefore, volumetric scans are usually the planning foundation. To enable an efficient planning and manufacturing procedure, there are several specific views on this volumetric data, which are in general standard two-dimensional cuts though the three-dimensional volume data. In the simplest case these views or cuts are oriented parallel to the coordinate system axes of the scan method. Depending on the region of interest, these views are not optimal for treatment planning purposes or manufacturing of orthodontic devices. Thus, views providing cuts along the specific tooth axes of the patient at hand would be preferable. To achieve the best desired view in the dental arch, a curve through all teeth of interest of a patient's specific jaw, e.g. enabling a panoramic view, would be helpful. However, because each patient is different, the curve of the dental arch can vary from patient to patient and among different scanning devices. Therefore, there is no universal solution that matches every patient and the curve must specifically be defined in each case. Consequently, either a suitable solution has manually to be established by a professional, or only sub-optimal views are provided by standard routines, resulting in less suitable information for treatment planning and device manufacturing.

The optimization of dental planning and manufacturing of dental devices as a function of scan data is also disclosed in the patent literature.

CN 102 609 965 A for instance discloses a data processing method of a panoramagram generated by a dental CBCT (cone beam computed tomography), comprising the steps of obtaining three-dimensional image data of full denture from oral digital tomography equipment; initializing a dental arch curve as a starting point of contraction or expansion; taking the contracted or extended curve as a dental arch curve used when expanding the panoramagram; obtaining a coordinate of each point on the curve, computing the normal direction of each point on the curve and setting the distance of the curve contracting inwards or expanding outwards; moving each point on the curve in the outer normal direction or inner normal direction of the point with a distance d; computing the distance of one point on a new curve to all points on the original curve; according to a distance threshold, performing screening; generating a final curve by all non-abandoned points on the new curve; and splicing multiple columns of data obtained by the final curve together in sequence to generate a corresponding panoramagram.

Furthermore, U.S. Pat. No. 2,020,175 681 A1 discloses a method for constructing a panorama of teeth arch with elements of interest emphasized, comprising the steps of: extracting a teeth arch from a volumetric image; unfolding the extracted teeth arch into a panoramic ribbon; assigning weighted priorities to at least two points in the panoramic ribbon, wherein priorities are weighted higher for points inside or proximal to elements of interest and applying a weighted summation in a direction perpendicular to teeth arch resulting in the panorama with elements of interest emphasized.

In addition, CN 107 301 622 A describes a panoramic image acquisition method and system for oral cavity CBCT images. The panoramic image acquisition method for the oral cavity CBCT images comprises the steps that a two-dimensional oral cavity CBCT image containing a tooth structure image is selected from multiple continuous two-dimensional oral cavity CBCT images to serve as a target two-dimensional image; a dental arch curve is recognized on the target two-dimensional image, and dental arch curves of all the two-dimensional oral cavity CBCT images are determined according to the dental arch curve on the target two-dimensional image; equidistant sampling is performed on the dental arch curves of all the two-dimensional oral cavity CBCT images to obtain multiple sampling points on all the two-dimensional oral cavity CBCT images, and the sampling points at the same position on all the two-dimensional oral cavity CBCT images are determined as one group of sampling points; a sampling matrix corresponding to each group of sampling points is acquired, weighted forward projection operation is performed on each sampling matrix, and multiple weighted matrixes are obtained; and all the weighted matrixes are spliced according to order, and a panoramic image of the oral cavity CBCT images is acquired according to the splicing result.

SUMMARY

In an embodiment, the present disclosure provides a process for manufacturing an orthodontic device comprising the steps of:

a) scanning at least a part of a patient's dentition with a volumetric image recording method so as to record volumetric 3-dimensional scan data;

b) segmenting the 3-dimensional digital scan data so as to obtain individual teeth and/or jaws;
c) determining a tooth main axis for each tooth in order to obtain a two-dimensional key point representation of each tooth in the occlusal plane;
d) fitting an even order parametric polynomial curve to approximate the dental arch as given by the tooth key points and including an incisal point as the vertex of the polynomial curve;
e) selecting at least one tooth key point on each side of the dental arch and transform the even order polynomial curve into a spline representation, wherein the spline representation is calculated at least including the selected tooth key points and the incisal point;
f) selecting one or more 2-dimensional cuts through the volumetric 3-dimensional digital scan data, wherein at least one size dimension of a tooth is determined from the 2-dimensional cut;
g) manufacturing an orthodontic device, wherein at least one size dimension of the orthodontic device is a function of the size dimension determined in step f).

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present disclosure at least partially overcomes the disadvantages known from the prior art. In particular, the present invention provides an improved and faster process for manufacturing of an orthodontic device, which enables a reliable, meaningful and less error prone visualisation of the tooth and arch condition of a patient and, therefore, enables the planning and production of improved dental devices.

Preferred embodiments of the invention are indicated in the description or in the figures, whereby further features described or shown in the description or in the figures may individually or in any combination constitute an object of the invention, unless the opposite clearly follows from the context.

The present invention provides a process for manufacturing of an orthodontic device at least comprising the steps of:
a) Recording volumetric 3-dimensional digital scan data by scanning at least a part of a patient's dentition with a volumetric image recording method;
b) Segmentation of the 3-dimensional digital scan data in order to obtain the individual teeth and/or jaws;
c) Determination of the tooth main axis for each tooth in order to obtain a two-dimensional key point representation of each tooth in the occlusal plane;
d) Fitting an even order parametric polynomial curve to approximate the dental arch as given by the tooth key points and including the incisal point as the vertex of the polynomial curve;
e) Selecting at least one tooth key point on each side of the dental arch and transformation of the even order polynomial curve into a spline representation, wherein the spline representation is calculated at least including the selected tooth key points and the incisal point;
f) Selection of one or more 2-dimensional cuts through the volumetric 3-dimensional digital scan data, wherein at least one size dimension of a tooth is determined from the 2-dimensional cut;
g) Manufacturing of an orthodontic device, wherein at least one size dimension of the orthodontic device is a function of the size dimension determined in step f).

It has been found that above-described process is able to provide a more intuitive and patient specific basis for the manufacturing and planning of dental devices, because the provided cuts or visual perspectives through the digital volumetric scan data enable a reproducible and patient specific visual and measurable basis, resulting in better adapted dental devices. In addition, the process provided perspectives enable an improved and more efficient planning of dental restorations or treatments in general and is able to reduce the amount of sub-optimally planned and processed devices. Such solution is favorable compared to using default case unspecific views for dental planning as it is performed nowadays by dental professionals. Also these standard processes use cuts or perspectives through volumetric scan data, e.g. of a Cone Beam Computed Tomography (CBCT) scanner, as the planning foundation. Nevertheless, usually standard views are provided by the planning software, wherein the cuts are oriented parallel to the CBCT coordinate system axes or along default inaccurate dental arch curves. Depending on the region of interest, these views are not optimal for treatment planning purposes. This finding is based on the fact that each dental arch varies from patient to patient. Consequently, there is no universal curve that matches every patient. To properly plan and design, the dental professional must be able to view and work with an accurate representation of the patient's dentition, jaw(s) and other supporting structure. Therefore, by using the inventive process it is possible to robustly derive patient specific and intuitive cuts through one tooth or the overall teeth landscape, e.g. in the form of a panoramic view. These cuts are obtained also in presence of some tooths gaps or even completely missing teeth sections. Having such an accurate representation of the patient's dentition is critical to successful dental treatment planning and prosthetics design.

The inventive process is a process for the manufacturing of an orthodontic device. Orthodontic devices are used in orthodontic technology, a technology field directed to the design and fabrication of dental appliances for the treatment of malocclusions, which may be a result of tooth irregularity, disproportionate jaw relationships, or both.

The process comprises the process step a), wherein volumetric 3-dimensional digital scan data are recorded by scanning at least a part of a patient's dentition with a volumetric image recording method. Volumetric 3-dimensional digital scan data originate from a scan method which is able to provide not only surface, but volume information of the dentition at hand. Methods like MRT or CBCT are able to provide density related data, wherein volume structures like a tooth or a jaw can be assessed not only on the surface, but the overall structure comprising the same or a similar density is resolved. Scanning of a patient's dentition means that at least a part of the oral cavity including tooth and/or jaw structures are scanned and the data is recorded.

The process comprises the process step b), wherein the 3-dimensional digital scan data are segmented in order to obtain the individual teeth and/or jaws. The volumetric 3-dimensional digital scan data recording method delivers regularly sampled density values, also called voxels, as digital representations of the oral cavity including teeth and jaws. These data are processed in this step, in order to separate the structure of interest, like a single tooth or jaw, from the overall scan. The segmentation thus means to argument each voxel with a specific label of a certain structure, like a specific tooth or bone part. Each structure could now be processed independently and it is possible to convert the volumetric data into individual triangle meshes representing the surface of these structures.

The process comprises the process step c), wherein the tooth main axis for each tooth is determined in order to obtain a two-dimensional key point representation of each tooth in the occlusal plane. In order to find a compact representation of the patient's teeth in the occlusal plane, where the panoramic curve should be defined, for each tooth its main axis is determined and their intersection with the crestal level is derived. The obtained point is projected on the occlusal plane. This key point is the foundation of the further processing and due to its simplicity allows a fast estimation of the dental arch. A representation of this step is later on described in the figures.

The process comprises the process step d), wherein an even order parametric polynomial curve is fitted to approximate the dental arch as given by the tooth key points and including the incisal point as the vertex of the polynomial curve. In order to find a symmetric and smooth curve for the patient's specific dental arch, the two-dimensional tooth key points were used as input for a parametric even order polynomial fit. The even order polynomial can for instance be a second, fourth sixth etc. order polynomial, wherein a second order polynomial is preferred. Further the polynomial curve shape is similar to a dental arch and thus the fit is forced into that shape as well. This makes the whole process quite robust in case that complete teeth sections are missing. The incisal point represents the point located between the incisal edges of the lower central incisors of the corresponding jaw and can be determined either by the corresponding key points of that teeth or as the local extreme point of the polynomial in that area.

The process comprises the process step e), wherein at least one tooth key point on each side of the dental arch is selected and the even order polynomial curve is transformed into a spline representation. The spline representation is calculated at least including the selected tooth key points and the incisal point. In order to maintain the overall arch symmetry, expressed by the symmetry given by the even order polynomial fit, but to find a closer approximation of the patient's dental arch, a spline representation is derived from that polynomial. Therefore, at least two points on each side of the incisal point are sampled. These sampled points together with the incisal points define the control points of a suitable spline representation. To increase the fitting accuracy of the spline with respect to the required dental arch these control points can be shifted along the normal direction of the polynomial at these points in such a way, that the spline includes these closest key points.

The process comprises the process step f), wherein one or more 2-dimensional cuts through the volumetric 3-dimensional digital scan data are selected, wherein at least one size dimension of a tooth is determined from the 2-dimensional cut. The spline representation is used as the symmetry basis for defining the cuts through the three-dimensional CBCT data. Based on this spline representation standardized cuts through the segmented CBCT data can be generated automatically. The cuts may be oriented according the special needs in the given surrounding, e.g. either a tooth or the jaw. The cut may be oriented in parallel or at any angle with respect to the spline representation. The two-dimensional cut may be in the form of a plane and includes structural features of a patient's tooth. As a function of this representation a size dimension, e.g. a width, a length, a distance or a volume of a certain tooth can be measured or calculated. It is also possible to obtain geometrical relationships between two or more teeth.

The process comprises the process step g), wherein an orthodontic device is manufactured, wherein at least one size dimension of the orthodontic device is a function of the size dimension determined in step f). As a function of the standardized cuts several dimensions can be obtained from the digital data related to the tooth of interest. It is also possible to generate data with respect to the spatial relation between different teeth. These geometrical and size data can be used for the treatment planning. Furthermore it is possible, that the data are the basis for the manufacturing of dental devices, which can be utilized in the course of the treatment.

Within a preferred aspect of the process, in step d) a teeth center point can be determined, wherein the teeth center point represents the mean center position of all teeth key points in the occlusal plane and a mean reference vector can be calculated, wherein the mean reference vector is the vector sum of the vectors extending from the teeth center point to the teeth key points determined in step c); and wherein the mean reference vector is directed to the incisal point of the dental arch and the angle difference between the mean reference vector and each vector connecting the teeth center point to the tooth key points is used as a parameter reference to fit the even order polynomial. In order to find an optimal approximation routine for the determination of the even order polynomial it has been found useful to include the angle difference between the mean reference vector and the vectors connecting the mean center point to the teeth key points into the routine. The teeth center point represents the mean center position of all teeth key points in the occlusal plane. This reference point is in the center of the dental arch and is required as an origin point for a supporting polar coordinate system which will be used in the following step to derive a continuous angular reference parameter for each tooth. The objective of the this is to derive an artificial continuous parameter for each tooth key point which is somehow roughly linearly correlated to the arch length within the dental arch. The reference axis of the polar coordinate system is derived from the direction of the sum of all vectors extending from the center point to the key points. The vector usually points roughly in the direction of the incisal point. The angular parameter of each key point transferred into this polar coordinate system is the foundation of a better suitable parametric polynomial fit. The advantage of the parametric polynomial curve is, that it could be rotated arbitrarily within the plane while maintaining its symmetry properties.

In a preferred embodiment of the process, in step e) at least two tooth key points can be selected on each side of the dental arch. For the transformation of the even order polynomial it has been found useful to use at least five points located in the dental arch. The center point is still the determined incisal point and besides that two further points or positions are defined on each side of the arch. It is possible to define them on any suitable tooth position present in the arch. It is further advisable to distribute the selected teeth key points symmetrically on the different sides of the arch.

In a further preferred embodiment of the process, in step e) at least the 4 positions according to the FDI notation can be selected. For a reproducible and robust planning it has been found useful to include the coordinates of the 4 positions according to FDI in the transformation of the even order polynomial into a spline representation. The symmetry of the overall polynomial curve approximation is maintained and the front teeth are better positioned by this step in the curve.

Within a preferred characteristic of the process, in step e) at least the 8 positions according to the FDI notation can be selected. For a reproducible and robust planning it has been found useful to include the coordinates of the 8 positions according to FDI in the transformation of the even order polynomial into a spline representation. The symmetry of the overall polynomial curve approximation is maintained and the molars are better positioned by this step in the curve.

According to a preferred embodiment of the process, in step e) at least the 4 and 8 positions according to the FDI notation can be selected. In order to find an optimal representation of the front teeth and the molars in a single spline representation it has been found useful to select above-described positions for building the spline. Furthermore, besides the good inclusion of front teeth and molars the selection is also very robust with respect to any missing teeth in the arch.

In a further preferred embodiment of the process, in the segmentation step b) also a triangle mesh representation of the segmented digital scan data can be calculated. In order to reduce the complexity of the system and the amount of data it has been found useful, to transform the segmented volume data into a triangle mesh surface structure representation.

In a preferred aspect of the process, the occlusal plane in step c) can be obtained based on the teeth triangle mesh representation and represents a plane connected to 3 tooth crown tip points, wherein the remaining teeth parts are all either below or above that plane. The determination of the occlusal plane can favorably be based on the mesh representation and for the definition of the occlusal plane the selection of the crown tips has been found advantageous as a compact representation for that purpose. The mesh representation accelerates the processing and the crown tips are good indicators for a reproducible definition of the location of the occlusal plane.

In a preferred aspect of the process, in step f) the 2-dimensional cuts can be parallel, perpendicular or tangential to the spline representation obtained in step e). Significant views for an improved planning and for the manufacturing of dental devices can be based on these angular relationships between the selected plane of visualization and the spline representation. Views are generated, which reproducibly display tooth structures and teeth dimensions and help to asses the teeth status of the patient at hand.

According to a preferred embodiment of the process, the volumetric image recording method can be CBCT (Cone Beam Computed Tomography). The inventive process has been found especially useful for processing volumetric data obtained by CBCT. The provision of standardized views can be performed very reliable and the process results in better cuts through the data, wherein the cuts are the basis of a more precise planning and device manufacturing process.

According to a preferred embodiment of the process, the orthodontic device can be selected from the group consisting of crowns, bridges, dentures, orthodontic aligners, surgical guides or combinations of at least two members of that list. Especially the members of said group of dental reconstruction devices can benefit from the improved process according to the invention. The reconstructions can be adapted very precisely to the patient's need and any misconstructions or special incompatibilities are avoided.

Furthermore, according to the invention is the use of the inventive process in the production of a dental device. Based on the better cuts of the scan data as described above it is possible to provide a better planning of dental treatments and it is possible to adapt the design and manufacturing of any devices used in the course of a treatment or for a dental reconstruction with respect to the specific patient's needs. Failures in the treatment are avoided and as a result of the better fit of the devices less treatment problems and in certain cases an accelerated healing can be achieved.

Furthermore, according to the invention is the use of the inventive process to define and provide the specific cuts through the three-dimensional CBCT digital data. This use is especially helpful in visualization and treatment planning.

According to a preferred embodiment of the use, the dental reconstruction can be selected from the group consisting of dental implants, prosthetics selected from the group consisting of crowns, bridges, dentures, orthodontic aligners; surgical guides for use during implant installation or combinations of at least two members of the group. Especially the members of said group of dental reconstruction devices can benefit from the improved process according to the invention. The reconstructions can be adapted very precisely to the patient's need and any misconstructions or special incompatibilities are avoided.

Furthermore, according to the invention is a computer program product comprising computer readable program code for performing the inventive process.

Figure 1:
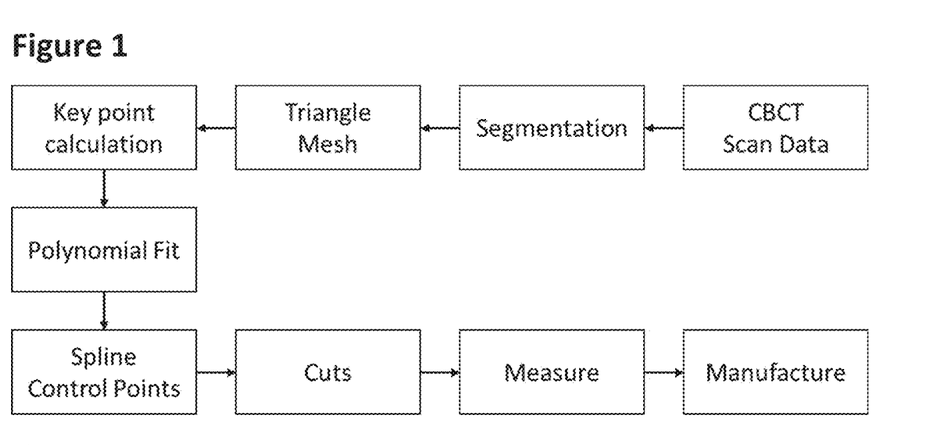
FIG. 1 a schematic representation of the process according to the invention.

FIG. 1 displays a schematic representation of the process according to the invention. In a first stage volumetric 3-dimensional digital scan data of a patient's dentition are obtained in the course of a CBCT scanning procedure. In the second step the scan data are segmented, wherein after segmentation the single structures in the oral cavity like teeth or yaws are resolved and can be handled separately. For each segmented structure a triangle mesh representation of the surface structures is generated. Based on the triangle mesh representation of the teeth surface structures the key points of each tooth can be detected. A possible key point may be the tooth main axis intersection with the crestal level projected to the occlusal plane. These key points are calculated for each tooth and are used to fit a parametric polynomial curve as preparation for creating a spline representation of the dental arch later. As a preferred parameter for the parametric polynomial curve the angle between the key points relative to their center and a unique reference vector can in addition be used. Using such angular parameter as a common basis for the two-dimensional fit, it is possible to derive a parametric polynomial curve. This parametric polynomial curve can be in the form of an even or second order polynomial fit and comprises the advantage to enforce the nearly symmetrical shape of a human dental arch. Additionally, the advantage of the parametric polynomial curve is, that it can fit to arbitrarily rotated dental arches within the scan while it maintains its symmetry property. Thus, this procedure works robust independently of the orientation of the dental arch within the scan as well as in case of tooth gaps and other disturbing effects. From the polynomial curve a spline is derived to increase the accuracy of the dental arch approximation. In general, 3 to 5 or more control points for the spline deliver an adequate precision while remaining pleasurable compact. The central spline control point could easily be derived as the vertex of the polynomial curve. In order to construct further spline control points the polynomial curve may be sampled symmetrically in equal arch distances to the vertex of the polynomial curve close to specific tooth positions (two on each side at ×4 & ×8 according to FDI). To achieve an accurate and symmetric spline curve these points can be shifted along the normal of the polynomial curve at these points into the direction of the closest key point. If certain required teeth were unavailable their position can be interpolated by neighboring teeth to place the control points still roughly at the desired position. Using this procedure, the spline control points can robustly be derived. Based on the spline representation certain cuts through the CBCT data can be achieved, wherein a parallel cut through the data along the spline representation results in the patient's specific panoramic view. This view can be calculated according to the invention also in presence of some tooths gaps or even completely missing teeth sections. Further cuts can be obtained perpendicular or tangential to the spline representation, for instance at the locations of the tooth key points in the occlusal plane. Based on the cut a very intuitive view is obtained and this view is a proper basis to access the patient's specific tooth dimension and, for instance, the distance to the surrounding teeth. Based on the defined view and the defined measurements a better planning and manufacturing process is possible compared to dimensions obtained by an undefined cut through the CBCT-data.

Figure 2:
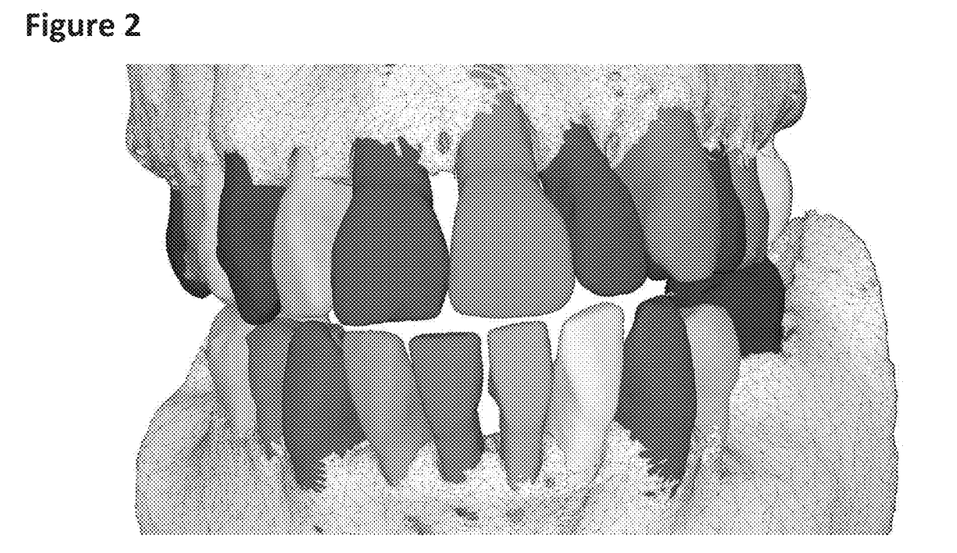
FIG. 2 a possible representation of segmented CBCT data.

FIG. 2 shows an example of volumetric 3-dimensional digital scan data in the form of a three-dimensional representation of the surface of jaws and teeth obtained by a CBCT scan. In this representation the structures are already segmented and converted to individual triangle meshes, wherein by the segmentation the volume data are resolved to structures, e.g., specific teeth in the oral cavity and extending into the jaw bone.

Figure 3:
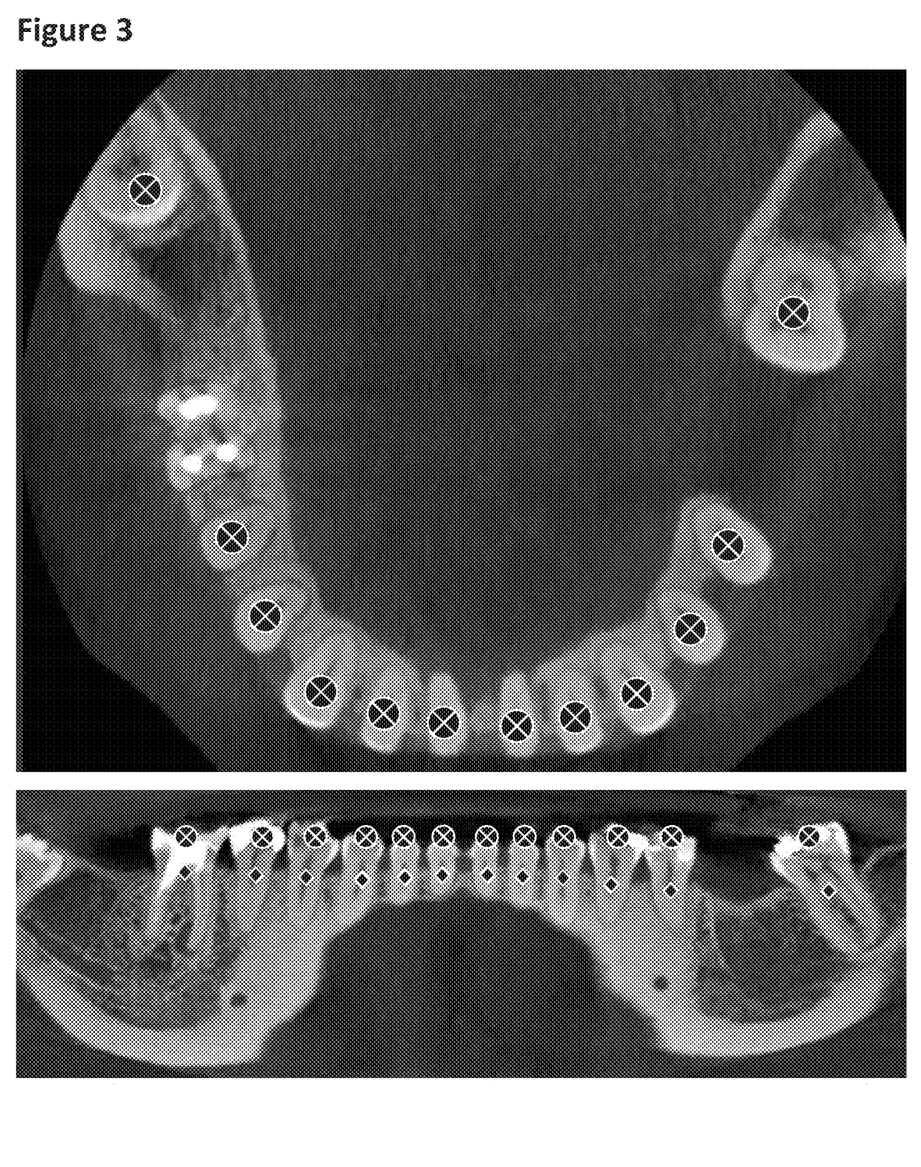
FIG. 3 calculated key points derived as a function of the tooth main axis.

FIG. 3 exhibits calculated key points. The key points are obtained approximately at the center of the intersection between the tooth main axis at the crestal level (black diamonds with white border). For the further calculation these points are projected to the occlusal plane (black crossed circles).

Figure 4:
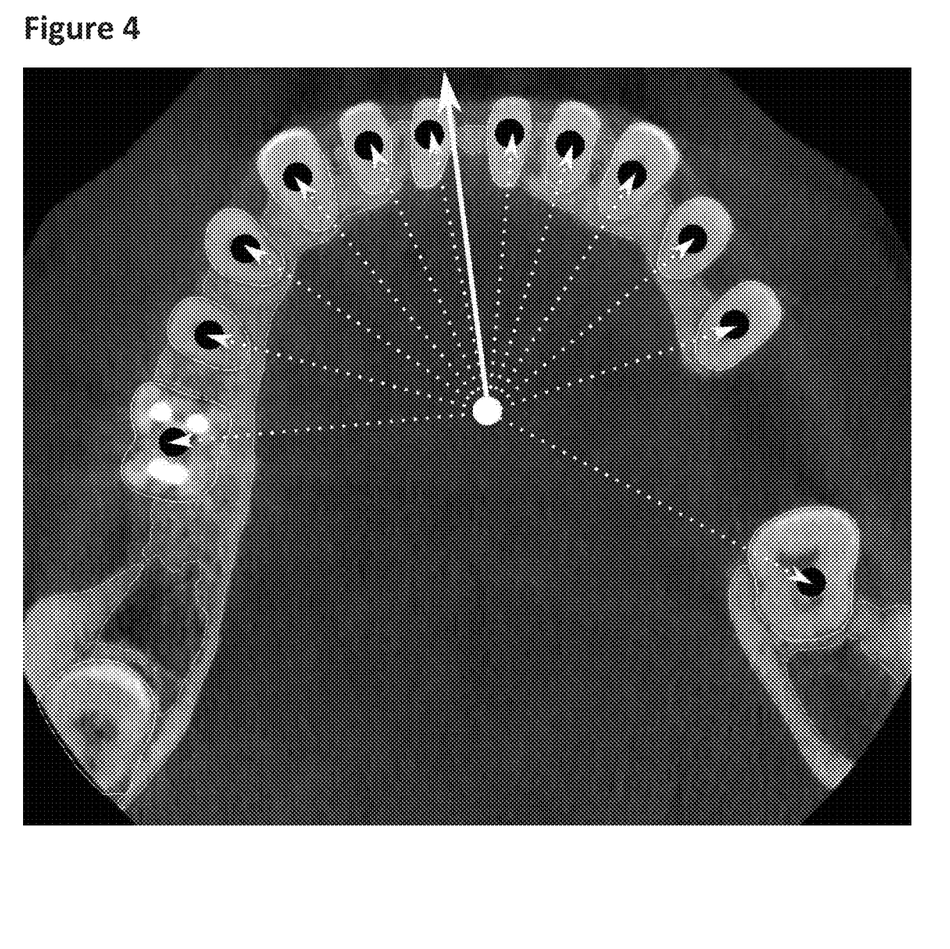
FIG. 4 the calculated connection vectors between the mean center position of all teeth key points in the occlusal plane and the key points of each tooth.

FIG. 4 shows the connection vectors (white dotted arrows) between the mean center position of all teeth key points in the occlusal plane. The mean center position (white circle) of all teeth key points is calculated from the teeth key points in the occlusal plane, wherein the mean position is a geometrical mean based on the position of each tooth key point. The connection vectors can be derived as extend from the teeth center point to the specific tooth key point. Based on the vectors an angular relation between the different vectors relative to a reference vector (solid white arrow) can be calculated which is determined as the normalized sum of all vectors. This specific angular relation can be a reference parameter of the parabolic or polynomial curve fit of the key points.

Figure 5:
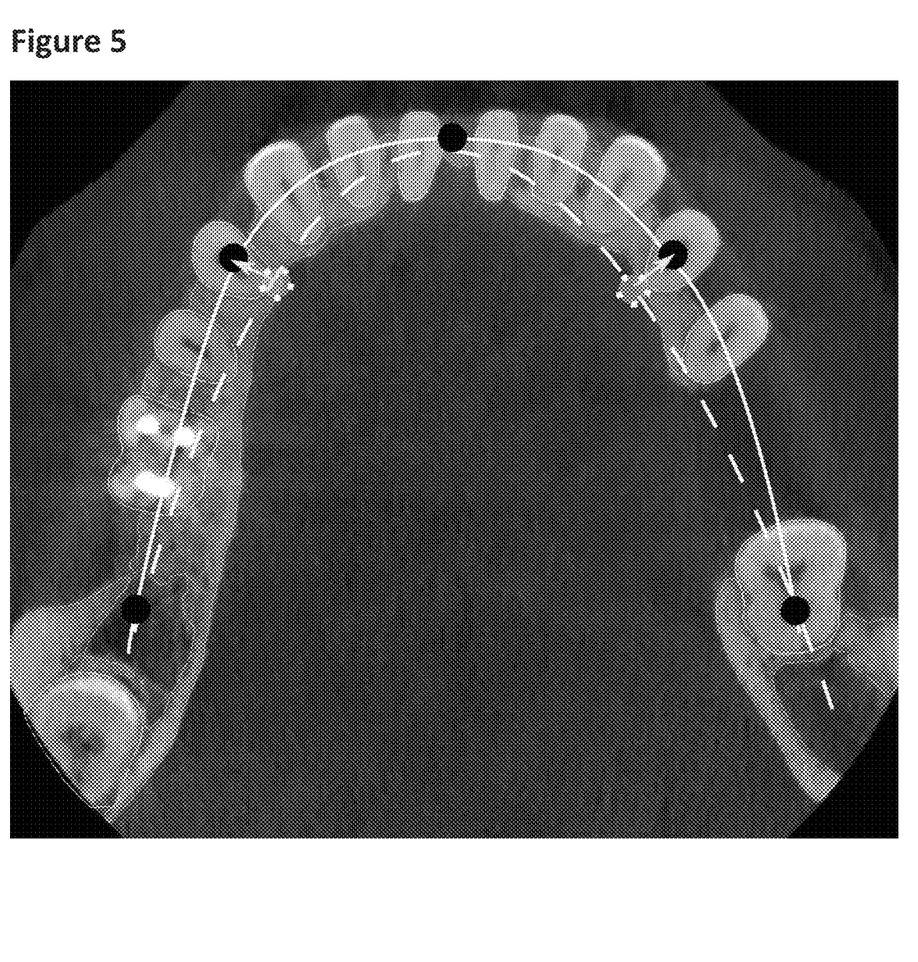
FIG. 5 a possible parametric polynomial fit of the key points and a possible construction of a spline representation of the panoramic curve by shifting points at special teeth positions on the polynomial curve along the normal of the polynomial curve at these points.

FIG. 5 displays a possible parametric polynomial fit (white dotted line) of the key points. For the calculation of the parametric two-dimensional polynomial curve the angular dependencies between the different vectors are used as reference parameter. Further, FIG. 5 shows a possible construction of a spline representation of the dental arch. The central spline control point (black dot at the incisal point) is determined as the vertex of the polynomial curve. The other control points (other black dots) are derived by sampling points (white dotted circles) at special teeth positions symmetrically with equal arch distance to the vertex of the polynomial curve. These points are shifted afterwards on the polynomial curve along the normal (arrow) of the polynomial curve at these points in order that the spline crosses the corresponding key point. Thus the spline keeps the symmetry of the polynomial curve while being an accurate and compact representation of the dental arch. Based on this representation standardized cuts through the segmented CBCT data can be generated. As a function of the standardized cuts several dimensions can be obtained related to the tooth of interest and the spatial relation between the different teeth. These geometrical and size data can be used for the treatment planning. Furthermore it is possible, that the data are the basis for the manufacturing of dental devices, which can be utilized in the course of the treatment.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A process for manufacturing an orthodontic device comprising the steps of:
 a) scanning at least a part of a patient's dentition with a volumetric image recording method so as to record volumetric 3-dimensional scan data;
 b) segmenting the 3-dimensional digital scan data so as to obtain individual teeth and/or jaws;
 c) determining a tooth main axis for each tooth in order to obtain a two-dimensional key point representation of each tooth in the occlusal plane;

d) fitting an even order parametric polynomial curve to approximate the dental arch as given by the tooth key points and including an incisal point as the vertex of the polynomial curve;
e) selecting at least one tooth key point on each side of the dental arch and transform the even order polynomial curve into a spline representation, wherein the spline representation is calculated at least including the selected tooth key points and the incisal point;
f) selecting one or more 2-dimensional cuts through the volumetric 3-dimensional digital scan data, wherein at least one size dimension of a tooth is determined from the 2-dimensional cut;
g) manufacturing an orthodontic device, wherein at least one size dimension of the orthodontic device is a function of the size dimension determined in step f).

2. The process according to claim 1, wherein in step d) a teeth center point is determined, wherein the teeth center point represents the mean center position of all teeth key points in the occlusal plane and a mean reference vector is calculated as the vector sum of vectors extending from the teeth center point to the teeth key points determined in step c); and wherein the mean reference vector is directed to the incisal point of the dental arch and the angle difference between the mean reference vector and each vector connecting the teeth center point to the tooth key points is used as a parameter reference fit the even order parametric polynomial.

3. The process according to claim 1, wherein in step e) at least two tooth key points are selected on each side of the dental arch.

4. The process according to claim 3, wherein in step e) at least the 4 positions according to the FDI notation are selected.

5. The process according to claim 3, wherein in step e) at least the 8 positions according to the FDI notation are selected.

6. The process according to claim 3, wherein in step e) at least the 4 and 8 positions according to the FDI notation are selected.

7. The process according to claim 1, wherein in the segmentation step b) also a triangle mesh representation of the segmented digital scan data is calculated.

8. The process according to claim 7, wherein the occlusal plane in step c) is obtained based on the teeth triangle mesh representation and represents a plane connected to 3 tooth crown tip points, wherein the remaining teeth parts are all below or above that plane.

9. The process according to claim 1, wherein in step f) the 2-dimensional cuts are parallel, perpendicular or tangential to the spline representation obtained in step e).

10. The process according to claim 1, wherein the volumetric image recording method is CBCT (Cone Beam Computed Tomography).

11. The process according to claim 1, wherein the orthodontic device is selected from the group consisting of crowns, bridges, dentures, orthodontic aligners, surgical guides or combinations of at least two members of that list.

12. The process according to claim 1, wherein further comprising performing a dental reconstruction.

13. A computer program product comprising a non-transitory computer-readable medium storing computer readable program code for performing the process according to claim 1.

* * * * *